United States Patent [19]
Carillon et al.

[11] 3,829,272
[45] Aug. 13, 1974

[54] ROTATIONAL MOLDING MACHINE

[75] Inventors: Frank R. Carillon; William E. Meyer, both of Akron; Dario J. Ramazzotti, Tallmadge, all of Ohio

[73] Assignee: McNeil Corporation, Akron, Ohio

[22] Filed: May 21, 1973

[21] Appl. No.: 362,099

[52] U.S. Cl. ............... 425/430, 164/326, 264/311, 425/435, 425/451
[51] Int. Cl. ............................................. B29c 5/04
[58] Field of Search ....... 425/429, 430, 4, 817, 425, 425/402, 435, 404, 405 R, 405 H, 450, 451, 434; 264/45, 50, 51, 94, 310, 311, 327; 164/323, 324, 325, 326, 130

[56] References Cited
UNITED STATES PATENTS

| | | | |
|---|---|---|---|
| 2,834,986 | 5/1958 | Bailey et al. | 164/326 X |
| 2,957,202 | 10/1960 | Rekettye | 425/430 X |
| 3,689,191 | 9/1972 | Westbrook et al. | 425/429 X |
| 3,775,036 | 11/1973 | Winning | 425/430 X |

*Primary Examiner*—R. Spencer Annear
*Assistant Examiner*—Mark Rosenbaum
*Attorney, Agent, or Firm*—Hamilton, Renner & Kenner

[57] ABSTRACT

Disclosed is an apparatus for rotationally molding or casting an article at a plurality of work stations where operations such as loading, heating and cooling take place. A vertically extending support member carries a plurality of mold carrying arms which through independent drive mechanisms travel from station to station during the molding process. The molds can be rotated on at least one axis at any or all of the stations to uniformly distribute material therein.

23 Claims, 8 Drawing Figures

ROTATIONAL MOLDING MACHINE

BACKGROUND OF THE INVENTION

This invention relates to rotational casting or molding equipment. More particularly, this invention relates to an apparatus which selectively and independently transfers molds from station to station in the rotational molding process.

Numerous types of devices for casting hollow articles are known in the art. By far the most popular device is one which fixedly mounts a plurality of mold carrying arms on a turret which rotates to move all the arms simultaneously from one operating station to another. Usually three arms are mounted 120 degrees of each other on the turret such that each arm is positioned at an operating station. At one station the mold of one arm is usually being loaded with a thermoplastic or like material, a process which takes very little time. At this same time a previously loaded mold on the second arm is being rotated and heated at an oven chamber or station while a third mold is being cooled on the third arm at a cooling station.

While operating satisfactorily, these machines are not without their problems. Because the mold arms are all tied together for movement on a turret, the time for the process steps is dictated by the longest step, that is, the heating. For the same reason, the machines lack versatility in that one arm or mold cannot be moved from station to station without the others also so moving. Thus, when a mold is cooled, for example, and ready to be unloaded and then reloaded, it must await the completion of the heating of the mold in the oven station. In addition, present systems do not provide the capability of reverse movement of individual arms, where, for example, it is desirable to remove a mold from the oven during heating to add a second charge of material and thereafter return the arm and mold to the oven. Such procedure would be virtually impossible in prior art designs.

In addition, most prior art devices of which we are aware are faced with other problems such as mold mounting. Normally, because the mold will expand during heating, it is merely extended in a cantilever fashion from the carrying arm. Such practice places a severe strain on the apparatus and limits the size of the mold to within certain weight tolerances. Similarly, because the molds are subjected to rotation on sometimes two axes, most prior art devices have not been able to provide any sufficient degree of bearing life due to the inability to readily cool the bearing structures.

SUMMARY OF THE INVENTION

It is thus a primary object of the present invention to provide a rotational casting apparatus wherein the molds therefor are carried on arms which are independently operable.

It is another object of the present invention to provide an apparatus, as above, the operation of which is not dictated by the time of the longest step.

It is a further object of the present invention to provide an apparatus, as above, to which mold carrying arms can be added or subtracted with relative ease.

It is still another object of the present invention to provide an apparatus, as above, with additional operating stations as may be necessary to accomplish a particular casting.

It is yet another object of the present invention, to provide an apparatus, as above, with the capability of translating the mold carrying arms in two directions as may be necessary to accomplish a particular casting.

It is still a further object of the present invention, to provide an apparatus, as above, with a unique means to mount the molds on the arms such that large molds may be easily handled.

It is an additional object of the present invention to provide an apparatus, as above, with a unique bearing cooling system so that rotation of the mold does not adversely wear the parts thereof.

In general, the apparatus for rotationally casting an article includes a vertical support about which are located a number of operating stations. A plurality of mold carrying arms, preferably one less in number than the number of stations, are independently rotatable about the support in a manner such that molds carried at the outer end thereof can be selectively positioned at or in the operating stations. Means are provided to rotate the molds while carried by the arms on at least one axis with each end of the molds being supported at the end of the mold carrying arms. Because of its support at each end, means are provided to account for any thermal expansion of the mold.

DESCRIPTION OF THE PREFERRED EMBODIMENT

Figure 1:
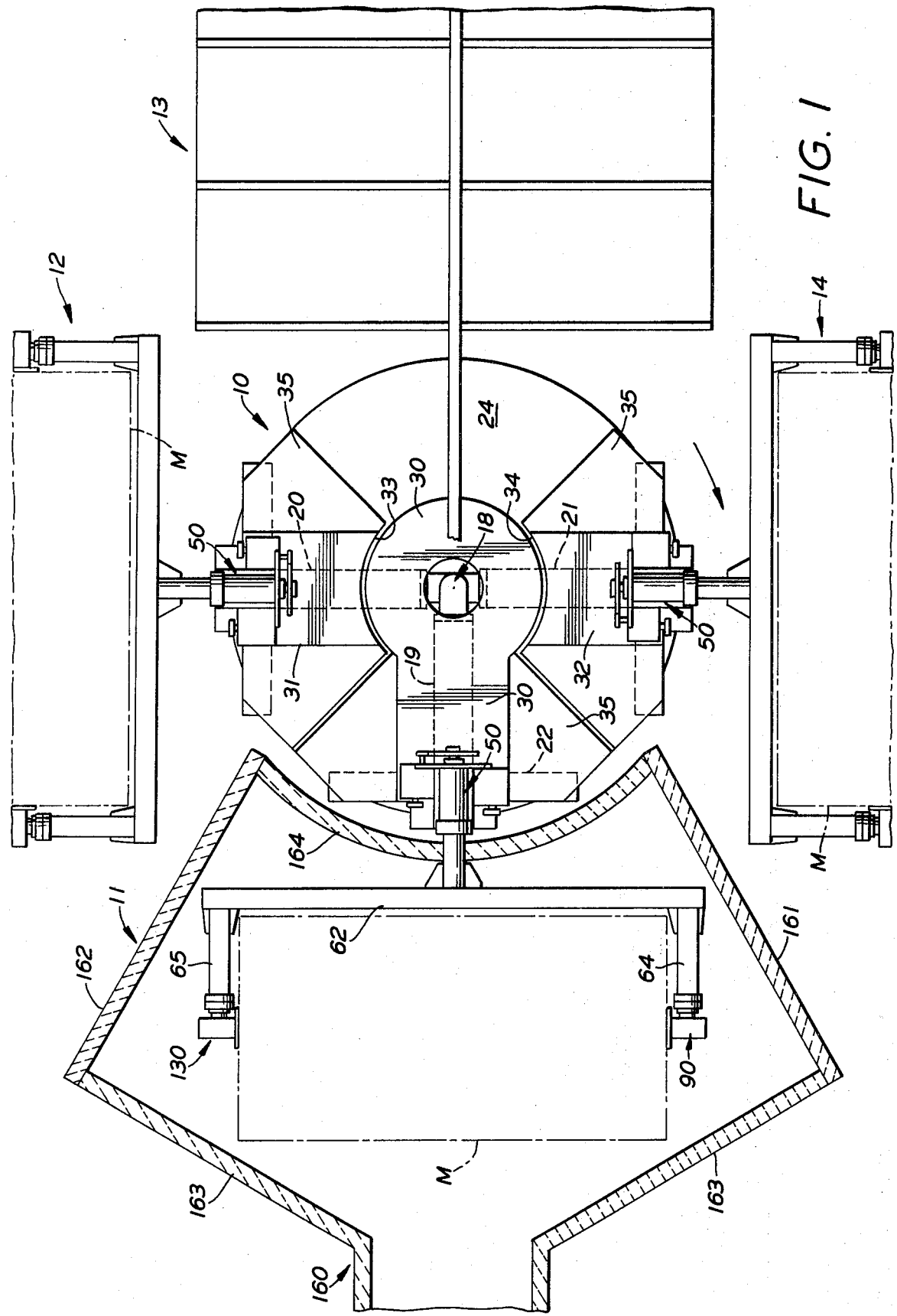
FIG. 1 is a partial top plan view of the apparatus according to the present invention shown somewhat schematically.

Apparatus for rotationally casting an article from a thermoplastic or like material is indicated generally by the numeral 10 in the drawings and is shown in FIG. 1 as being used in conjunction with four operating stations 11, 12, 13 and 14, generally ninety degrees of each other. As will hereinafter be described in more detail, station 11 is shown as an oven or heating station with station 13 being shown as a cooling station. Stations 12 and 14 can be used for loading or unloading the molds or could be used as an additional cooling station, as desired.

Figure 2:
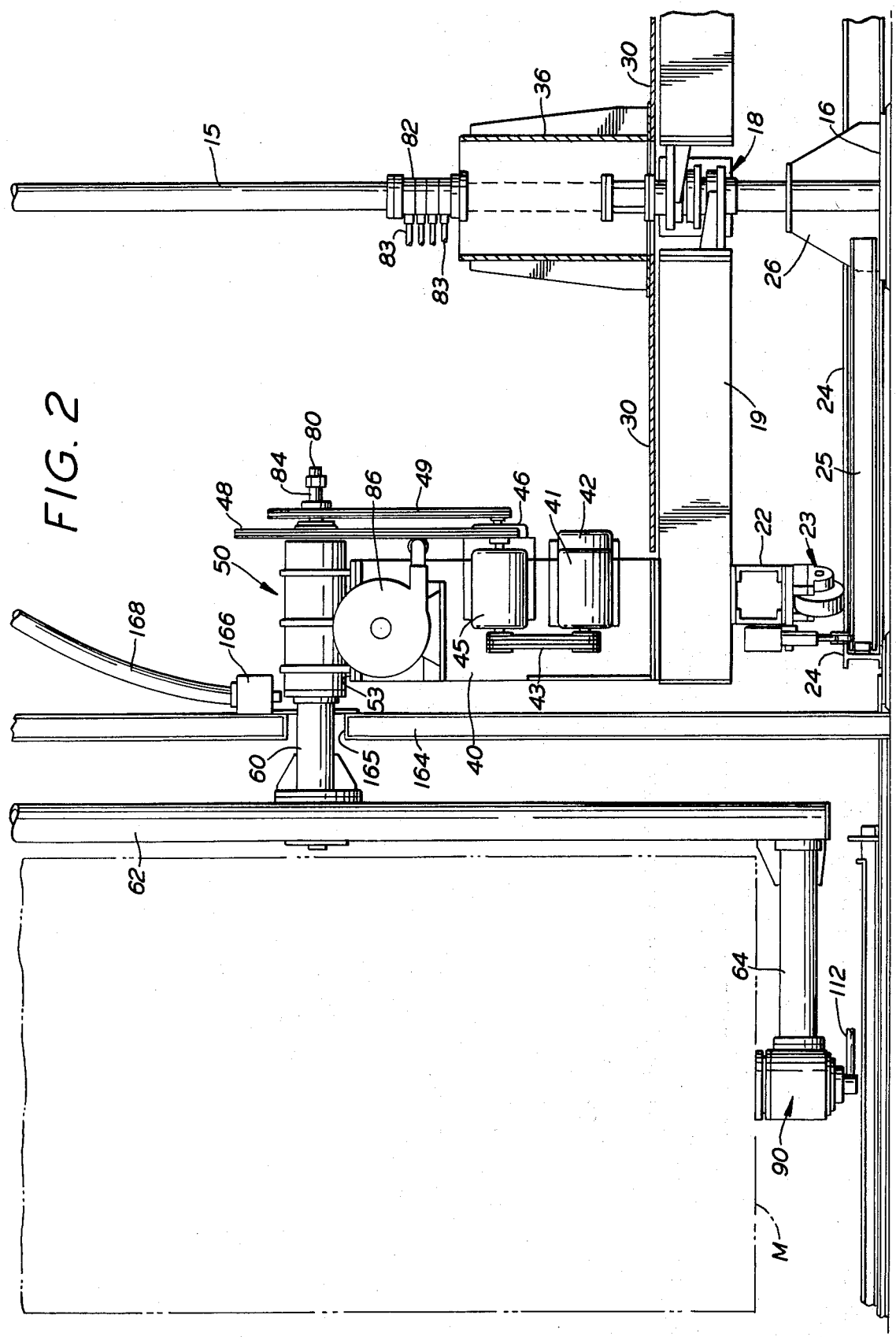
FIG. 2 is a partial elevation of the apparatus according to the present invention shown partially in section.

As perhaps best shown in FIG. 2, a post or generally vertical support 15 is located generally centrally of stations 11, 12, 13 and 14 and is mounted on a base 16 which rests on the floor or could rest on any other suitable support. A large center bearing assembly indicated generally by the numeral 18 carries, in the preferred embodiment, three radially extending arms 19, 20 and 21. While three arms are shown, it should be evident that essentially any number of arms could be utilized in the system with it being preferred that there be at least one less arm than the number of operating stations. Each arm is independently movable around post 15 and is generally identical to the others so that the description of arm 19, to follow, will, with certain exceptions herein noted, apply to all three arms 19, 20 and 21.

A cross beam 22 is fixed near the outer end and below arm 19 to carry, among other members, wheel assemblies 23 on each end thereof. Wheels 23 ride on a circular track 24 which, in the preferred embodiment, can be a large I-beam. Track 24 is stabilized by a plurality of spokes 25 which engage a hub or brace 26 affixed to the vertical support or post 15. The cross beam 22 also supports an arm drive motor 28 (FIG. 3) which through belt 29 drives one of the wheels 23 to rotate arm 19 on post 15.

Fixed to and spaced above arm 19 is a keyhole shaped platform 30 suitable for holding the operator of the apparatus 10. Arms 20 and 21 have similar platforms 31 and 32 except that these platforms do not have the circular portion of platform 30 but are rather generally rectangular with arcuate surfaces 33 and 34, respectively, which fit around platform 30. In addition, each arm can be supplied with a lower platform 35 (FIG. 1) which is in the shape of a sector of an annulus and which can be utilized as a step to reach platforms 30, 31 and 32 as well as to service various parts of the apparatus. The control panels and the like (not shown) can be mounted at any convenient place near the platforms for facile operation of the apparatus. Some of the electrical controls (not shown) can be shielded from the working elements of the apparatus by a generally cylindrical shield plate 36 (FIG. 2) mounted on platform 30 and extending around post 15.

A vertically extending support block 40 is mounted at the outer end of each arm as best shown in FIG. 2. As will hereinafter be described, the mold M is capable of rotation about two axes as controlled by a major axis drive motor 41 mounted on block 40 and a minor axis drive motor 42 mounted somewhat behind motor 41 on block 40. The power from motors 41 and 42 is transferred through belt 43 and an identical belt (not shown) behind belt 43 in FIG. 2 to gear reduction units 45 and 46, respectively. Through chains 48 and 49, respectively, the major and minor axis power is transferred to sprockets 51 and 52 of the mold carrying extension arm assembly generally indicated by the numeral 50 and shown in detail in FIGS. 4 and 5.

Figure 4:
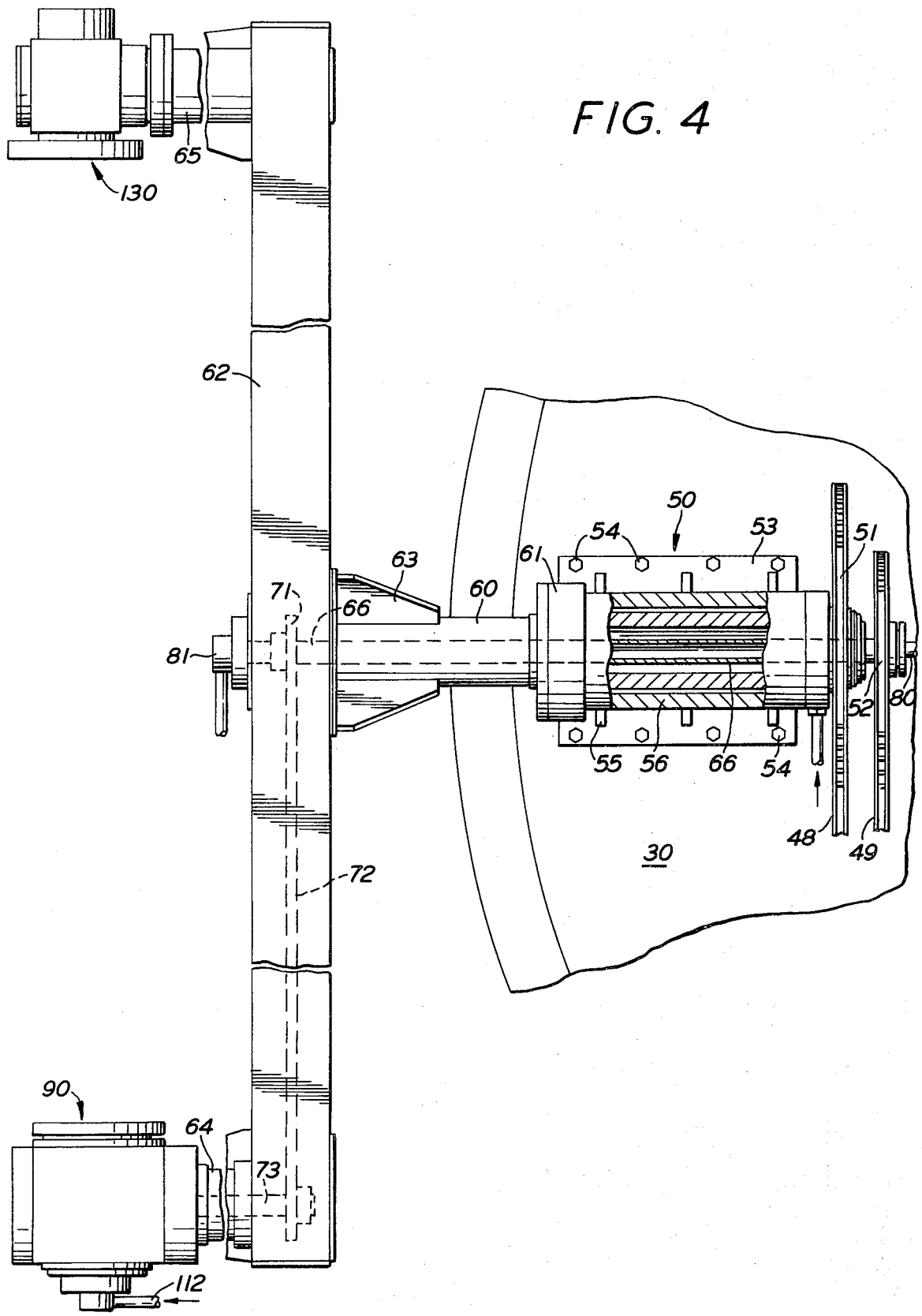
FIG. 4 is an enlarged view of portions of the apparatus depicted in FIG. 2 showing more details thereof with portions thereof being shown in section.

Arm assembly 50 is mounted on a plate 53 which is fixed to block 40, as by bolts 54. Support members 55 are welded to arm housing 56 to assure rigidity of the arm assembly 50 with respect to arm 19 and its associated elements. Sprocket 51 is welded to cap member 58 which is keyed, as at 59, to the major axis shaft 60 for rotation therewith. Shaft 60 is a generally hollow member which extends through an end plate 61 of housing 56 and is fixed to cross arm beam 62. Gusset plates 63 lend support to this connection. Cross arm beam 62 is a hollow member made up of a number of steel sheets and carries, at the outer ends thereof, the mold carrying drive arm 64 and idler arm 65, as shown in FIGS. 1 and 4. Rotation of sprocket 51 thus rotates cross arm beam 62 and arms 64 and 65 to rotate the mold M carried thereby on the axis of shaft 60.

Figure 5:
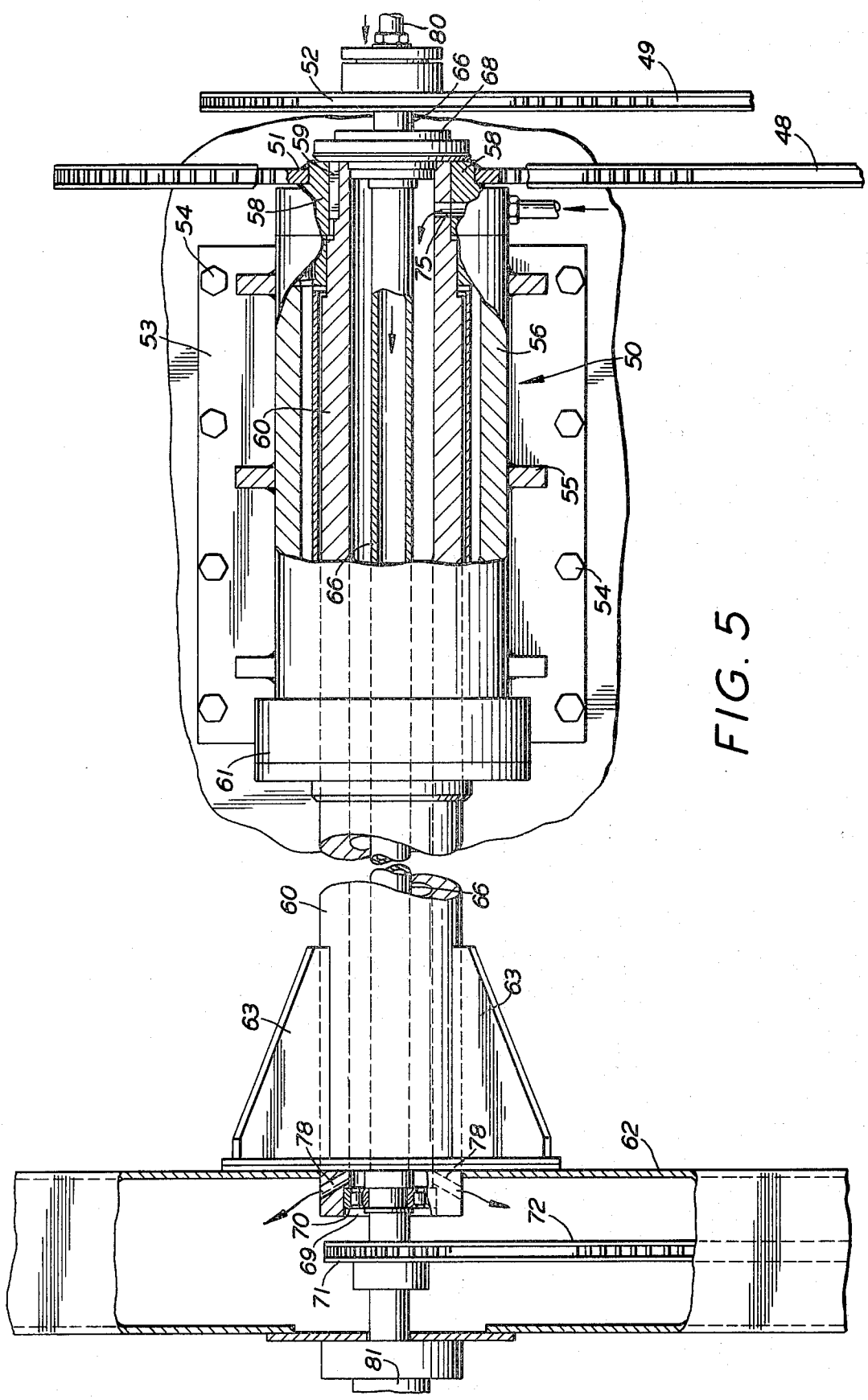
FIG. 5 is an additional enlarged view of portions of the apparatus depicted in FIGS. 2 and 4 showing more details thereof with portions thereof being shown in section.

Minor axis sprocket 52 is fixed to minor axis shaft 66 which extends through bearing retainer cap 68, shaft 60, bearing retainer cap 69 and into the cavity within cross arm beam 62. Suitable bearings 70 are shown between shaft 66 and cap 69. Shaft 66 is also preferably a hollow member and has a sprocket 71 affixed thereto within cross arm beam 62. As shown in FIGS. 4 and 5, sprocket 71 drives through chain 72, a shaft 73 which extends within drive arm 64. As will hereinafter be described in detail, rotation of shaft 73 revolves the mold M on a minor axis generally 90 degrees of the major axis and which can be the axis of the mold itself.

As best shown in FIG. 5, cap member 58 and major axis shaft 60 are provided with aligned bores 75 through which cool air or the like is transferred from a fan or blower 76 (FIG. 2) mounted on block 40. Air is forced into shaft 60 and around shaft 66 in the direction of the arrows in FIG. 5 and exits through bores 78 in bearing retainer cap 69 into cross arm beam 62. The cool air is forced through mold carrying arms 64 and 65 to cool the bearings for the minor axis rotation in a manner to be hereinafter described.

In a similar fashion, in the preferred embodiment, inert gas is introduced through piping 80 and into the hollow minor axis shaft 66 to exit at outlet 81 at the inner end of cross arm beam 62. From this point the gas may be transferred, as by a tubing, to the end of drive arm 64 where it can be introduced into the interior of the mold during the heating process, as may be desirable during certain casting processes. While the inert gas may be supplied from any convenient source, it has been found particularly useful to provide inert gas and other fluid sources through a conventional rotary joint 82 on post 15. As shown in FIG. 2, joint 82 has four potential outlet hoses 83 one of which can receive the inert gas from a source within post 15 and transfer it by a hose (not shown) to the nipple 84 extending from and communicating with minor axis shaft 66. The remaining hoses 83 can be utilized, for example, to provide air sources to other equipment in the apparatus.

Figure 6:
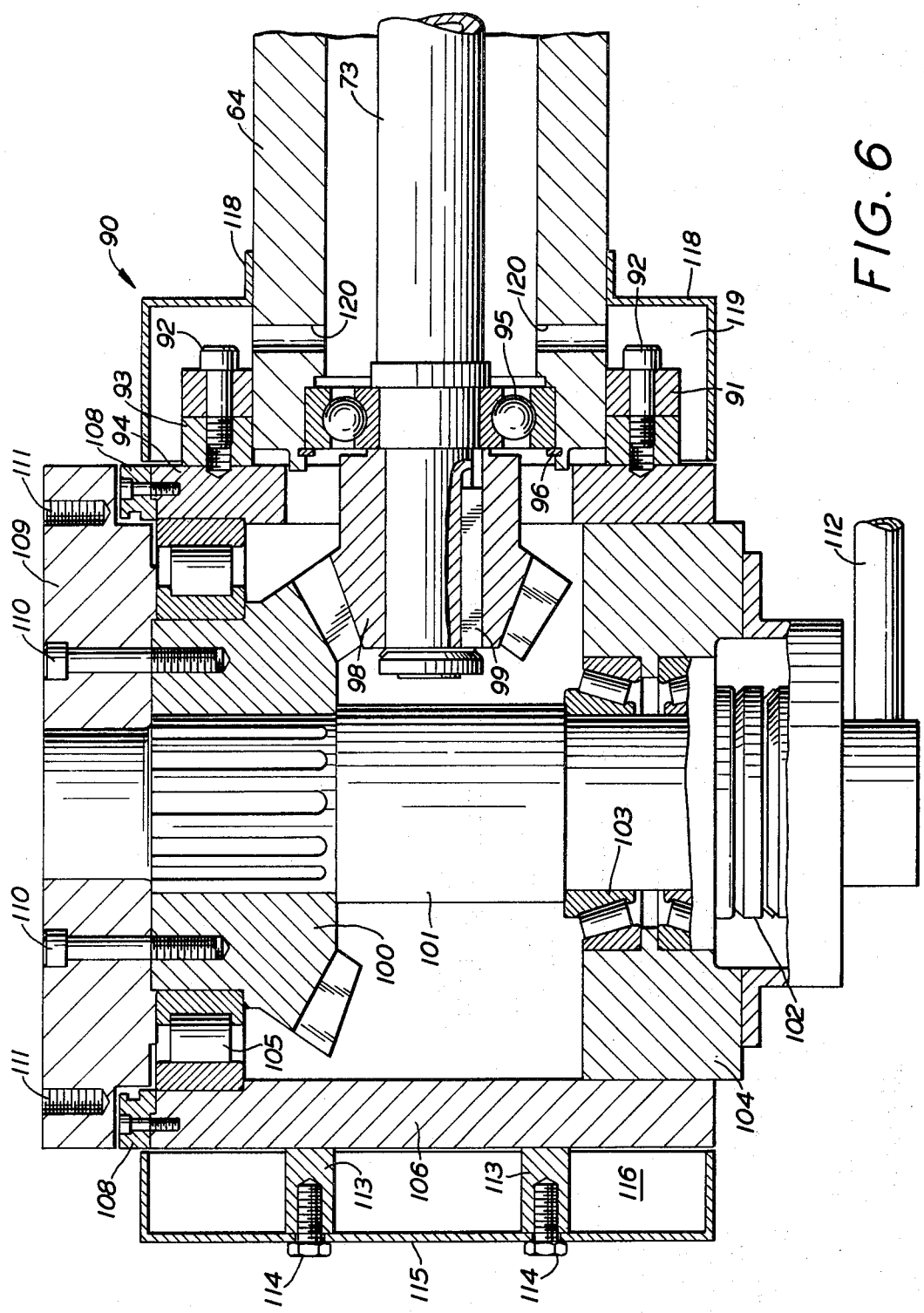
FIG. 6 is a sectional view of one side of the mold carrying apparatus according to the present invention.
Figure 8:
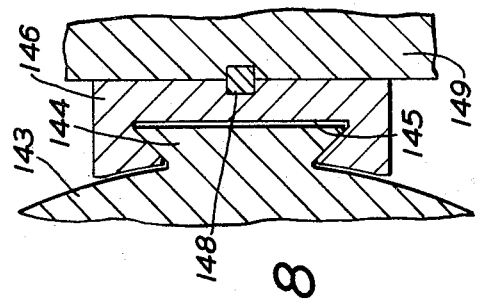
FIG. 8 is a sectional view taken substantially along line 8—8 of FIG. 7.

A drive arm head assembly, indicated generally by the numeral 90, is best shown in FIG. 6 as being mounted at the end of drive arm 64. An annular flange plate 91 is welded to the outside of arm 64 and is fixed, as by machine screws 92, to a second annular plate 93 which is welded to a bearing housing plate 94. The shaft 73 which is rotated, as previously described, by the actuation of minor axis drive motor 42, extends through bearings 95, which fit within the end of arm 64 and are maintained in place by snap ring 96, and has a pinion gear 98 fixed, as by key 99, to the end thereof. Pinion gear 98 communicates with a bevel gear 100 which is fixed to a transverse shaft 101 to rotate the same. Shaft 101 is journaled in end bushings 102 and extends through bearings 103 retained in housing 104. Bearings 105 between the body of bevel gear 100 and plate 94 and end plate 106 are kept in place by retainer plate 108.

A mold mounting block or plate 109 is fixed for rotation with shaft 101 as by cap screws 110. Plate 109 is bored and threaded, as at 111, to receive mold M thereon for rotation with shaft 101. An opening in the mold M communicates with the interior of shaft 101 which can be a hollow member to receive the inert gas or whatever desired medium from outlet 81 of shaft 66. To this end, outlet 81 may communicate with the interior of shaft 101, as by tubing 112, so that at any desired time, inert gas or other fluid can be transferred internally of the mold M.

End plate 106 has two mounting posts 113 welded thereto which receive screws 114 to hold a cover plate 115 in place forming a compartment 116. Similarly, an angular cover plate 118 can be fixed to arm 64 such that another compartment 119 is formed with compartments 118 and 119 communicating through spaces formed by top and bottom covers (not shown) to provide one continuous bearing cooling chamber. This bearing cooling chamber which essentially surrounds the head assembly 90, receives cool air or other fluid through ports 120 in arm 64. As previously described, arm 64 receives its air from blower 86 as it forces air through shaft 60 and cross arm beam 62.

Figure 7:
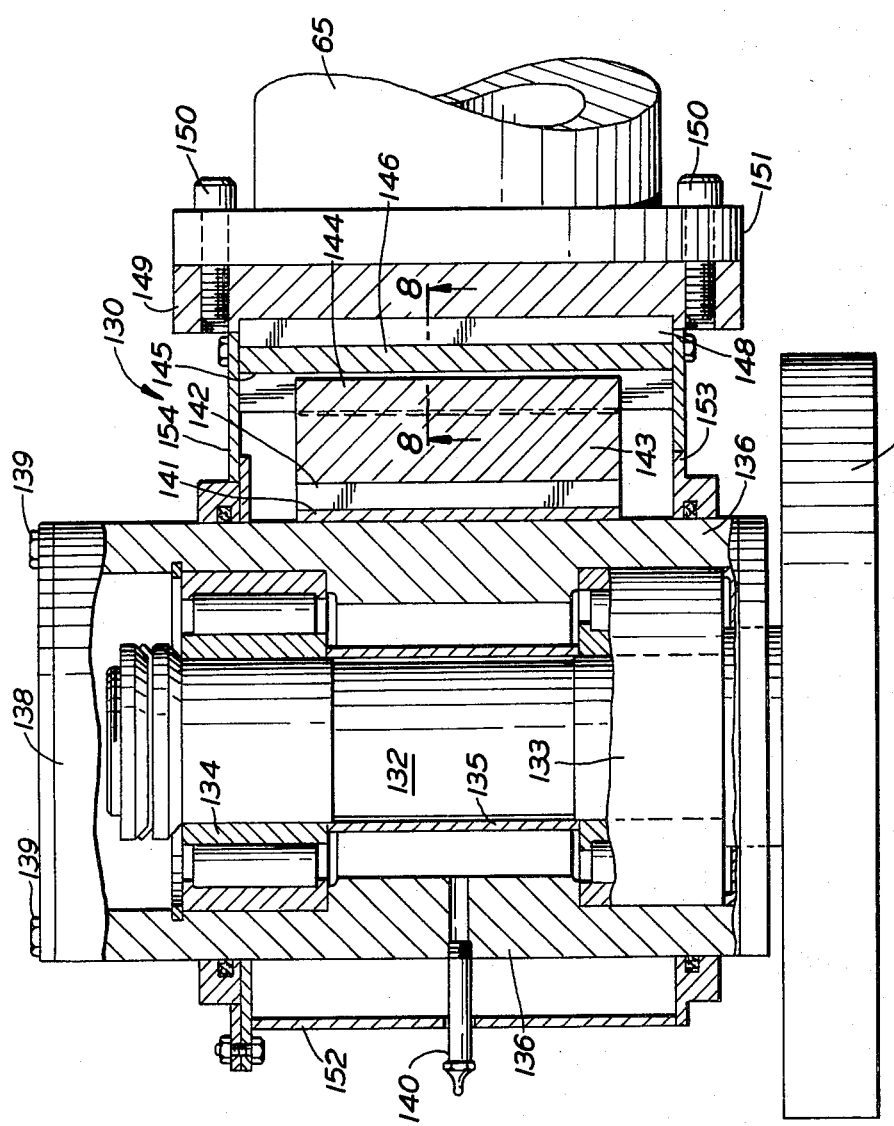
FIG. 7 is an enlarged sectional view of the side of the mold carrying apparatus opposite that of FIG. 6 and showing the thermal expansion features of the present invention.

The other end of mold M is mounted for rotation on an idler head assembly carried by arm 65, indicated generally by the numeral 130 and shown in detail in FIG. 7. A mold mounting plate 131, somewhat similar in design to plate 109, is capable of having the mold M affixed thereto and terminates in a stub shaft 132 journaled in bearings 133 and 134 with a spacer 135 therebetween. Bearing assemblies 133 and 134 are maintained within a housing 136 which has a cover plate 138 affixed thereto, as by screws 139. The interior of housing 136 and bearings 133 and 134 can be maintained well lubricated through lube fitting 140 extending into the wall of housing 136.

A plate 141 is welded to housing 136 to carry, as by key 142, a thermal takeup guide 143 having an integral key 144 slidable in keyway 145 of a stationary plate 146. Plate 146 is keyed, as at 148, to an adapter plate 149 which is threaded to receive screws 150 to hold an end fitting 151 of arm 65 thereto. Thus, the idler assembly 130 is carried at the outer end of arm 65 but the mold carried by assembly 30 can be permitted to expand due to the heating thereof as a result of the slidable movement of thermal takeup guide 143 and the elements associated therewith (including the mold M) with respect to the stationary plate 146 and the elements associated therewith (including shaft 65). This feature renders the apparatus usable in processes requiring large molds which could not have been feasibly carried by arms of prior art design.

Like drive head assembly 90, idler head assembly 130 receives cool air from fan 86 through arm 60, cross arm beam 62 and arm 65 into chambers formed by end cover 152 and side covers 153 and 154. Top and bottom covers (not shown) totally enclose the entire idler head assembly 130 to form one continuous chamber therearound for cooling air.

In a conventional rotational casting process, the mold M is first charged with the thermoplastic or other material from which the article is to be made at a loading station, which could be station 14 in FIG. 1. While the mold is being loaded at station 14, another mold M on arm 19 is shown in FIG. 1 as being heated at oven station 11. Oven station 11 is somewhat standard in the art and consists of an enclosure 160 having an entrance door 161, an exit door 162, rear panels 163 and an arcuate front panel 164 having a slot 165 therein (FIG. 2) for the passage of arm 60 therethrough. In order to maintain as much of the heat as possible in the oven, an air curtain directed by nozzle 166 across slot 165 can be provided. Nozzle 166 receives its air from a blower (not shown) through hose 168. It is while in the oven station that the mold M is usually rotated on one or two axes, either separately or simultaneously by selective actuation of motors 41 and 42.

A third mold M is carried by arm 20 and shown in FIG. 1 in station 12. In the system shown, station 12 is actually the free station, it being important for the independent operation of arms 19, 20 and 21 that there be at least one more station than there are arms such that one station will always be open or free. Station 12 can be used as an initial cooling station, could be used as a loading station or could be used as an unloading station after the mold has been cooled in station 13. In FIG. 1 it could be presumed, for example, that arm 20 is about to move into station 13 for complete cooling or that arm 20 has just come out of station 13 (by reverse operation of motor 28) for unloading. Station 13 can be merely a sheet metal enclosure where cool air, water or the like is put in contact with the mold M.

As the arms are moved back and forth or around from station to station on track 24, it is advisable to provide a means to lock the arms in place at locations where operations are occurring, such as the operating stations. A mechanism for so locking each arm is indicated generally by the numeral 170 in FIG. 3. Mounted on the same level as, but on the inside of circular track 24, is a plate 171 having a slot 172 therein. A pneumatic cylinder 173 is mounted on cross beam 22 so that it can pivot slightly on axis 174. The piston rod 175 of cylinder 173 has a clevis 176 thereon which carries a roller 177. Roller 177 is also engaged by a clevis 178 on piston rod 179 of lock cylinder 180 pivotally mounted on a bracket 181 depending from cross beam 22. A limit switch 182 senses the position of the cylinder 180.

Figure 3:
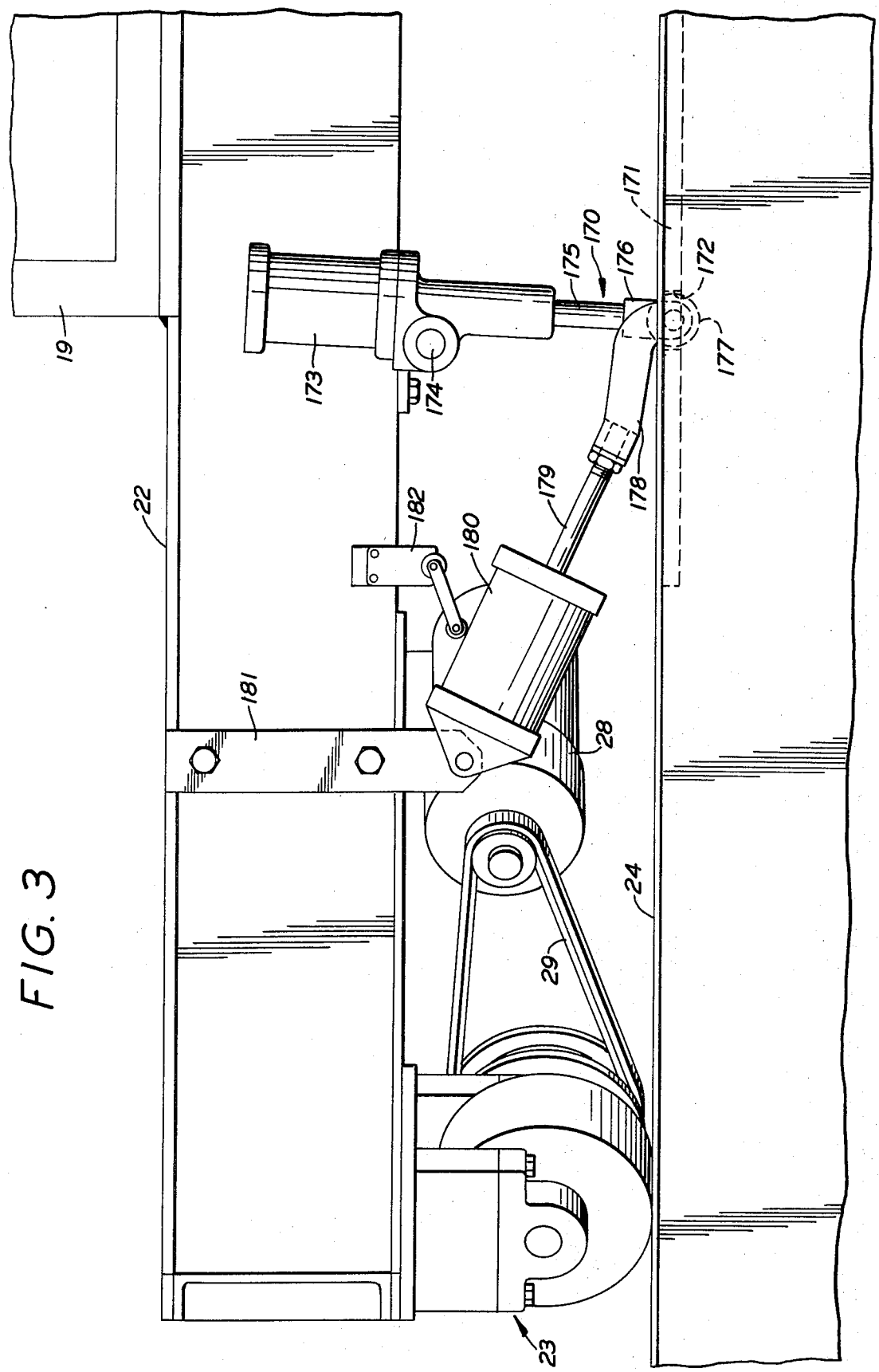
FIG. 3 is an enlarged partial elevational view of the arm driving and locking mechanisms used on the apparatus according to the present invention.

In the position shown in FIG. 3, both piston rods 175 and 179 are extended and the roller 177 is in slot 172 thereby locking the arm 19 in place. When it is desired to move arm 19, cylinder 180 is activated to retract rod 179 to unlock the roller 177 and piston rod 175 retracted to lift roller 177 out of slot 172. The arm is then free to move on track 24. Upon nearing the next stop position where, of course, another plate 171 will be located, piston rod 175 may be extended and roller 177 will ride on plate 171 until it drops in slot 172. This will pivot cylinder 180 slightly to trip switch 182 and actuate cylinder 180 to lock the roller in place. Because the arms are capable of moving in both directions, it is advisable to utilize another locking mechanism, generally a mirror image of mechanism 170 just described, to assure that travel in both directions is impeded.

It should be evident that extra arms and stations could be readily added to an existing structure merely by adding the new arm to the bearing assembly 18 of post 15. Similarly, each mold carrying arm could be adapted to carry more than one mold without departing from the spirit of this invention. In any event, the independent, reversible operation of the mold carrying arms lends a great deal of versatility to the apparatus and otherwise accomplishes the objects of the present invention to substantially improve the rotational casting art.

What is claimed is:

1. Apparatus for rotationally casting an article in a mold at a plurality of operating stations comprising, a support member; a plurality of arm assemblies extending from said support member, said arm assemblies totalling in number up to one less than the number of operating stations; each said arm assembly including means to carry at least one mold near the outer end thereof, means to rotate said mold on at least one axis, and drive means; said arm assemblies travelling around said support member independently from station to station upon the selective actuation of said drive means of each said arm assembly.

2. Apparatus according to claim 1, further comprising a track member, each said arm assembly having wheels thereon powered by said drive means and riding on said track member.

3. Apparatus according to claim 2, further comprising means to lock said arm assembly at a predetermined location along said track member.

4. Apparatus according to claim 1, said arm assemblies including means to hold the mold at each end thereof.

5. Apparatus according to claim 4, wherein said means to hold the mold includes bearing means to permit rotation of the mold on one axis.

6. Apparatus according to claim 5, further comprising means to cool said bearing means.

7. Apparatus according to claim 5, wherein said means to hold the mold includes a drive head assembly for rotating the mold on one end of the mold and an idler head assembly on the other end of the mold.

8. Apparatus according to claim 7, further comprising means in said idler head assembly to account for thermal expansion of the mold.

9. Apparatus according to claim 1, wherein each said arm assembly includes a shaft, means to rotate said shaft, a cross arm beam carried by and rotated with said shaft, and mold carrying arms carried by and rotated with said cross arm beam.

10. Apparatus according to claim 9, each said arm assembly further comprising means on said mold carrying arms to permit rotation of said mold on an axis generally 90° of the rotation of said shaft.

11. Apparatus according to claim 10, wherein said shaft is hollow and communicates with a source of air to cool said means to permit rotation of said mold.

12. Apparatus according to claim 11, wherein said cross arm beam and said mold carrying arms are hollow and carry air from said shaft to said means to permit rotation of said mold.

13. Apparatus according to claim 11, wherein each said arm assembly includes a second shaft in said shaft, and means to rotate said second shaft to rotate said mold on said axis generally 90° of the rotation of said shaft.

14. Apparatus according to claim 13, including means in said cross arm beam to transfer the rotation of said second shaft to a third shaft in one of said mold carrying arms.

15. Apparatus according to claim 13, including a drive head on the end of one of said mold carrying arms, said drive head carrying said means to permit rotation of said mold, said third shaft communicating with said drive head.

16. Apparatus according to claim 13, including an idler head on the end of one of said mold carrying arms, said idler head including means to permit thermal expansion of said mold.

17. Apparatus according to claim 13, wherein said second shaft is hollow and carries inert gas to said mold.

18. Apparatus according to claim 17, wherein said second shaft receives said inert gas from said support member.

19. Apparatus according to claim 1, wherein one of the stations is an oven station wherein the mold is heated, said oven station being totally enclosed but having a slot therein for the passage of said arm assembly therethrough, and an air curtain covering said slot to maintain the heat within the oven.

20. Apparatus according to claim 19, wherein another of said stations is a second oven station.

21. Apparatus according to claim 19, wherein one of said stations is a cooling station.

22. Apparatus according to claim 21, wherein another of said stations is a second cooling station.

23. Apparatus for rotationally casting an article in a mold at a plurality of operating stations comprising a track member; a plurality of arm assemblies supported by and riding on said track member, each said arm assembly including means to carry at least one mold near the outer end thereof, means to rotate said mold on at least one axis, and drive means; said arm assemblies traveling around said track member independently from station to station upon the selective actuation of said drive means of each said arm assembly.

* * * * *